Nov. 14, 1961 M. C. FERNANDEZ 3,009,147
SYSTEM OF CONTINUOUS RADIOLOCATION FOR AIRCRAFT
Filed July 1, 1958 5 Sheets-Sheet 1

INVENTOR.
MANUEL CASTRO FERNANDEZ

BY
ATTORNEY

Nov. 14, 1961  M. C. FERNANDEZ  3,009,147
SYSTEM OF CONTINUOUS RADIOLOCATION FOR AIRCRAFT
Filed July 1, 1958  5 Sheets-Sheet 3

MANUEL CASTRO FERNANDEZ
INVENTOR.

MANUEL CASTRO FERNANDEZ
INVENTOR.

Nov. 14, 1961 M. C. FERNANDEZ 3,009,147
SYSTEM OF CONTINUOUS RADIOLOCATION FOR AIRCRAFT
Filed July 1, 1958 5 Sheets-Sheet 5

MANUEL CASTRO FERNANDEZ
INVENTOR.

BY

ATTORNEY

United States Patent Office 3,009,147
Patented Nov. 14, 1961

3,009,147
SYSTEM OF CONTINUOUS RADIOLOCATION FOR AIRCRAFT
Manuel Castro Fernandez, % Alameda 8, Madrid, Spain, assignor of fifty percent to Carlos C. Goetz, Lisbon, Portugal
Filed July 1, 1958, Ser. No. 746,001
Claims priority, application Spain Apr. 10, 1956
7 Claims. (Cl. 343—112)

The present invention relates to a new system of continuous radiolocation for aircraft. This application is a continuation-in-part of applicant's pending U.S. Serial No. 643,374, filed March 1, 1957.

Despite the numerous innovations made in electronic radio systems used by ships and aircraft to determine their position, there has not yet been devised a system that will indicate in a continuous and almost instantaneous manner, the position of said moving craft on a map, as heretofore the members of the crew have always been obliged to make a number of computations, utilizing certain data which either delay or render the precision of such determination useless after having accomplished same, for example, during the rapid crusing speed of an aircraft, as upon completion of said estimate, the aircraft has already surpassed the determined spot, so that an establishment of the position will result erroneous, and above all when under a heavy drift which at times is an unforeseen phenomenon or difficult to determine, whereas in such cases which certain systems tend to comply with these exigencies, these generally require special conditions of propagation in the radio waves that are not always deemed appropriate or else require a number of ground installations provided with an assembly of extraordinarily expensive equipments.

The object of the present invention has been devised in order to surmount this problem and is constituted by a system comprising a housing for the controls, a servo-amplifier unit and an indicator which receives the high and low frequency signals emitted by the automatic radio-goniometers on board, transforming same into optical or mechanical signals that mark the QTE or lines of the geographical position produced in two radio beacons shown on the map, which to this effect are mounted to the indicator screen and whose intersection marks the exact position of the moving craft. Furthermore, there appears an optical or mechanical outline indicating the course or actual cruising line taken upon the surface of the map by the moving craft, so that rectifications of the course can be made instantaneously without any previous calculations. Should the moving craft, at any given moment, not be seen inside the zone covering the map, the bearings QTE will then furnish a very appropriate idea of its position and moreover the outline of the moving craft would indicate the exact direction thereof, that is to say, whether it is cruising towards the desired spot or, on the contrary, that its course is not correct.

Hereinafter the new system will be described, both with respect to the transformation of the signals received by the automatic radiogoniometers on the bearing QTE or geographical lines, as also to ensure that these bearings fix their origin at any point of the map in which two of the radio beacons, utilized at any given moment, are situated.

The accompanying drawings furnish an idea of the general performance of the system towards which two low or high frequency signals, received by the radio beacons, are directed, as for example the so-called North American ADF equipments for low and intermediate frequencies and the VOR navigation equipments at high frequency, and a cruising signal from an electronic compass or in the lack thereof, from a manually operated system.

In the drawings:
FIGURE 1 shows the principal circuit diagram of the system;
FIGURE 2 shows the same circuit diagram with modified functions;
FIGURE 3 shows the same circuit diagram with other modified functions;
FIGURE 4 is a view in perspective of a housing for parts of the invention and provided with a map receiving results of the system;
FIGURE 5 is a view in perspective of cooperating parts of the system for purposes of computation;
FIGURE 6 is a view in perspective partly broken away showing the contents of the housing of FIGURE 4;
FIGURE 7 is a detail view in perspective partly in section of a pilot lamp assembly;
FIGURE 8 is a diagrammatic view in perspective showing means of calibration;
FIGURE 9 is a diagrammatic view in perspective showing modified means of calibration.

The system described herein can likewise indicate the position of the craft by connecting same with VOR-TACAN receiving sets or ADF radiogoniometer equipments and a DME distance measuring equipment in such a manner that the luminous tracing on the map, at a certain scale, is in proportion with the radio beacon serving to determine the QTE and the distance, while said luminous tracing is furthermore provided with luminous marks, applied as distance indicators.

Sheet No. 1 represents the principle diagram of the system showing therein; the synchronous repeaters 2 and 3 corresponding to a direction finger 4 or to the VOR system 5, taking shunts from both stators and leading them towards a three pole switch 6 that feeds the stator of another repeater 7 with the signals received from the direction finder or radiogoniometer 4 or from the VOR system 5 in accordance with the position of the switch 6. The rotor of the repeater 7 is spliced to the entrance of the amplifier 8 of the servo-mechanism destined to move the motor 9 so that it will receive a rotation 10 with respect to a reference position 11 of the motor housing and identical with the bearing 12 indicated by the radiogoniometer or the VOR system in compliance with the nose of the aircraft or ship. As in all servo-mechanism, the motor 9 is in this case spliced mechanically with the rotation of the repeater rotor 7, so as to provide the system, by means of gears 13, with the feedback required for said servo-mechanism.

An entirely identical system is destined to direct the signals from a second radiogoniometer 14 or VOR system 15 towards another repeater 16, servo-mechanism 17 and motor 18 that will furnish the bearing 19 with respect to the reference position 20 of its own housing to another syntonized station by means of the direction finder 14 or VOR system 15. During an extensive use of the equipment, each servo-mechanism will indistinctly receive the signal from an ADF or from a VOR system, from previously syntonized stations, each in accordance with the frequencies of the stations utilized and which are shown on the map, however, such craft as have means limited to one only goniometer receiver or to one only VOR system can also be utilized by directing towards a servo-mechanism the signal from one station and thereafter when this has indicated its QTE inject in the other servo-mechanism the signal from the other subsequently syntonized station, whereby the position will then be determined, although not with exactly the same precision.

Should the nose of the aircraft or ship point towards the north, while the magnetic variation is nil, then the angles 10, 19 described by the motors 9, 18 of the servo-mechanisms, minus 180 degrees, will be identical to the two QTE of the two syntonized stations, so that upon plotting or tracing on the map two lines forming said resultant angles, the northern direction of the map and which have their origin in the geographical situation of said stations, the position of the craft will be obtained at the intersection point of the said two lines. The tracing of said lines is effected automatically, as will be described hereinafter, thereby disposing at all times of two QTE and consequently also of the position occupied by the craft at any desired moment.

Should the nose of the craft not be pointed north, that is to say, when there is a certain magnetic track and furthermore a definite magnetic variation, it will then be necessary to added the sum of these two angles to the angle formed by the propagation line of the electromagnetic wave between the syntonized station and the nose to stern line, or the bearing and this sum from the magnetic track with the bearing given by a radiogoniometer can be effected automatically, should the craft be provided with an electronic compass 21 of any type that will operate a repeater synchronous motor 22 similar to those utilized with direction finders. To this effect, shunts are taken from the stator of one of the repeaters 22 of the magnetic track and are lead towards a servo-amplifier system 23, 24 identical with such that are utilized with the direction finder or VOR system, heretofore described. The angle 25 described by the motor 26 of the servo unit corresponding to the electronic compass is added by means of gears that will be described hereinafter, to the angles 10, 19 or the bearings given by the two first mentioned servo units 9, 18 destined to obtain the two bearings required to fix the position of the craft.

Should the craft not be provided with an electronic compass 21, it is then possible to manually control the rotor of a synchronous motor 27, of the auto or self-synchronizing type which, after an appropriate amplification of the signal by the corresponding servo unit 23, 24, will produce the rotation 25 of its motor 26 and consequently the sum of said angle 25 with the two bearings 10, 19 of the other two motors 9, 18, thereby obtaining the two angles required for location. A mechanical addition of the angle of magnetic variation is made, so that the bearings will not be submitted to said error, as will also be described by figures hereinafter.

Sheet No. 2 illustrates the manner in which the results are shown on the map. Upon a housing 28, provided with a large window 29, a map or a part thereof 30, at any desired scale, covering the navigation zone, is extended. This map or plan 30 should be slightly transparent, so as to enable a vision of the luminous tracings or lines applied to the lower portion thereof. Two laterally opposed slots 31, 32 are provided with protruding and knurled discs 33, 34 for a horizontal displacement of the rotary axes of luminous tracings, whose axes are indicated by colored luminous spots 35, 36 corresponding to the situation of the station on the map that are syntonized in order to determine the position of the craft. Two knobs or buttons 37, 38, are mounted to corresponding corners of the upper portion of the apparatus and are destined for the vertical displacement of said axes. By means of said discs and knurled buttons, the colored spots 35, 36 can be placed in correspondence with the rotary axes of the luminous tracings upon the spots in coincidence with the geographical situations of the two stations applied for the determination of the actual position of the craft.

Should the map or plan, extended upon said detector housing be pointing north towards the upper portion of the indicator, then no rectification of the angles or QTE given by the two luminous tracings is required, as the intersection 41 thereof, will at all times indicate the exact position of the craft, however, as on many occasions, plans are utilized wherein the north point does not coincide with the direction of the upper portion of the apparatus, it will then be necessary to effect a rectification of the angles which with respect to the upper portion of the indicator, are given by the two luminous tracings 39, 40, by adding thereto a supplementary rotation identical to that formed by the north point of the map with the vertical direction of the indicator, that is always known. This rectification, as will be disclosed hereinafter, is made mechanically, by providing to this effect a protruding and knurled disc 42 mounted to the upper portion of the housing 28 and in the proximity of a graduated scale 43 that is applied for the measurement of said rectification.

This control disc furthermore serves to achieve a rectification of, or the sum of the magnetic variation, to which effect it will suffice to rotate same in identical degrees to those of the said magnetic variation that is supposed to exist within the navigation zone.

The silhouette or outline of the craft 44, advancing along its route on the map, is shown upon the screen of the indicator, by utilizing to this effect a mechanism that will be described hereinafter.

Sheet No. 3 represents the mechanism for summing up the angles of each bearing with that of the magnetic track, as also that of the magnetic variation and the orientation of the map or plan.

The three connections 45 established by shunts taken from a repeater 22, Sheet No. 1, for the electronic compass 21, Sheet No. 1, excite the three windings of a stator 23 by means of appropriate collector rings 46, provided said stator 23 can be submitted to rotation. Should the magnetic track be at zero and the map pointing north while the magnetic variation is likewise nil, it is then that this stator 23 will occupy a well determined position and thus its rotor 47 will be directed in an appropriate manner, as the induced voltage thereof or error signal of the corresponding servo-mechanism will flow through the connections 48, thereby exciting the corresponding amplifier 24 which will move the motor 26 and thus by means of the reducing gears 49, 50 will rectify the orientation of the rotor 47 until this latter is properly oriented in accordance with the direction 51 of the field produced inside the repeater 23 by currents that are introduced through the conductors 45 of the repeater for the electronic compass. By this means the rotor 47 will align with the zero direction 51 of the stator 23.

When the compass points to a magnetic track other than zero, the field inside the stator 23 will rotate at an angle 52 with respect to the shell of said stator so that a voltage is induced in its corresponding rotor 47 while a current of a determined phase and amplitude flowing through the conductors 48 amplifies same by means of the corresponding amplifier 24 which thus causes a rotation of the motor 26 until rotor 47 is aligned in such a manner that there is no induced voltage whatsoever, by means of a rotation identical to that of the angle 52 in virtue of the graduation of the magnetic track.

The rotation angle 52 produced by the magnetic track in the rotor 47 is transmitted by means of the gears 53, 54 to the stator shells of another two synchronous repeater motors 7, 16 so that the rotation 55 provides a like number of degrees and therefore the angle 58 formed by the magnetic field with the zero or reference direction of the stator 7 in virtue of the currents flowing through the brushes 59 from a repeater of an automatic radiogoniometer or from a VOR receiver being supplemented by this rotation 55 of the stator 7. This gives rise to an induced voltage in the rotor 56 which is lead towards the amplifier 8 and from there to the motor 9 which in turn and by means of gears 13 rectifies the orientation of the rotor at an angle identical to that of 55, that is to say until a new equilibrium situation of zero induced voltage in the rotor 56 is obtained. Thereby the magnetic tracks 52, 55 is added to the bearings or angles 58 which each rotor 56, 57 has with respect to its casing 7, 16. Due to the rotation of the stator shells of said motors 7, 16 it will be necessary to make the electrical connections by means of annular contacts and the corresponding and appropriate brushes 59.

A knurled control disc 42 provided with a graduated scale 43, transmits by means of a spindle 60 its rotation to the stator shell of the repeater 23 and thus adds the angle of magnetic variation and orientation of the map, to which reference was made heretofore. This new angle 61 of the shell 23 affects its rotor 47 and by means of the gears 53, 54, the stator shells 7, 16 and therefore also the rotors 56, 57 that indicate the QTE. It is now required to transfer the total rotation of the rotors 56, 57 of the repeaters 7, 16 to the corresponding points of the map. To this effect, reference will first be made to the mechanical device utilized to transfer the rotation of each to the rotors 56, 57 that indicate the QTE to the luminous or mechanical indicators used to transfer same to the map, despite the transfer movements which said luminous projector or mechanical indications can undergo.

The motor 9 is controlled by the amplifier 8 that is excited by the signal induced in the rotor 56 of one of the two synchronous repeater motors 7. The motor 9 through a series of reducing gears 13 and bevel worms 62, transmits its movement by means of a sprocket 63 to the rotor 56 incessantly, until the rotor 56 is aligned with the field produced by the stator of its repeater motor 7 and which will have an orientation, as heretofore described that is identical to the sum of the magnetic track, bearing, magnetic variation and rectification of the map; this same rotation being transmitted through the bevel gear 64 to the spindle 65 and control mechanism for the movement of the luminous projectors located underneath the map and housing 28.

On Sheet No. 4 it will be appreciated that this rotation is transmitted by means of a spindle 65, and that the bevel gears 66, 67 in turn transmit said rotation to another spindle 68 provided, along its entire length with a channel or groove 69 to which a bevel wheel 70 is keyed so as to enable a displacement thereof along said spindle 68 in coincidence with the rotary movements of this latter. An angular bearing 71 ensures a continuous engagement of said bevel wheel 70 with another bevel wheel 72 which thereby transmits the rotary movement of said spindle 68 to another spindle 73, although this is displaced in parallelism therewith and dragged along by the carriage 71, whose movement will be described hereinafter.

Said spindle 73 is also provided, along its entire length, with a channel or groove 74, so that a worm 75 keyed thereto, will acquire identical rotation to that of the gears 70, 72 during its longitudinal displacement on the said spindle 73 imposed by the action of a displacement in the direction of a carriage 76.

Finally, a rotary movement of the worm wheel 75 gives rise to an identical rotary movement of a sprocket 77 together with its sleeve 78 and thereby also to a rotation of a small lamp 79, provided with a cap 80 having a slot 82 through which a streak of light 81 is projected on to a transparent surface 30 mounted in parallel to a platform 83 and thus this streak of light 81 is converted into a luminous line 40. The light penetrating through the transparent colored piece 84 thereby projects a luminous spot 36 that is displaced, as will be described hereinafter, until it coincides with the geographical position of the radio electrical station and thus syntonizes therewith. By this means, the light ray 40 which, after having made the appropriate adjustments, is emitted from the situation on the map of said station, will then represent the corresponding QTE line.

The transfer movement of the carriage 76, corresponding to a radiogoniometer, can be displaced in two mutually perpendicular directions, by means of two appropriate adjustment knobs 37, 38 that are also shown on Sheet No. 2. The knurled disc 33, by means of a gear 85 and two bevel gears 86, 87, transmits its rotary movement to a pair of threaded rods 88, 89 and thereby a pair of threaded angular pieces 71, 90 are displaced simultaneously and in a parallel movement with the carriage 76 and said threaded rods 88, 89. A mechanism, of identical characteristics and mounted to the opposite side of the housing, permits a displacement of a second carriage 91, with a sufficient degree of movement, so that any point of the map or plan can be made to coincide with the intersection of said two QTE bearings projected thereupon by the corresponding lamps, utilizing to this effect exclusively the selection of the appropriate radio electrical station operating on either of the two carriages 76, 91, that is to say, each carriage can only move within the space left by the other. The discs 33 penetrate to a certain extent through an appropriate slot applied to the cover of the housing 28, situated on the left or right hand side margin, as is shown on Sheet No. 2.

In a perpendicular sense to said transverse movement of the carriage 76, another displacement can be obtained, as is indicated on Sheet No. 4, and wherein it is shown that by the rotation of a knob 37, the rotary movement thereof can be transmitted by means of a bevel wheel 92 to a spindle 93, provided with a longitudinal groove 94, so that another bevel wheel 95, during its displacement, can retain and follow the rotation controlled by said knob 37, and that thereby this movement can be transmitted by another bevel wheel 96 to the threaded rod 97, thus causing a displacement of the carriage 76, threaded thereto along the entire length of said threaded rod 97.

By the aforedescribed arrangement, it will be possible to situate the luminous spot 36, indicating the axis of the rotary movement of the QTE line, on the desired point of the map or plan without any further limitations than, should under any special circumstance, a carriage 76 not reach said position, the other carriage 91 could then be placed in said position, while the corresponding self-synchronizing motor 7 or 16, Sheet No. 1, should then have to be connected with the radio electrical station whose position coincides with the luminous spot 36 on the map. During the plotting of maps care should be taken that the radio electrical station to be used, will occupy a position that will not obstruct the movements of the carriages. In order to achieve a permanent connection of said pilot lamps 79 during all their movements, use is made of a contact 98 that is insulated from the mass in connection with the central portion of the lamp socket 79 and by means of a spring 99 to a plate 100 that is insulated from the mass by a dielectric plate 101 and in connection with an appropriate voltage source for the projection lamps.

The rotary movement produced by the magnetic track upon the rotor spindle 47, Sheet No. 3, was heretofore increased by the rotation sum of the magnetic variation and orientation of the map, which was transferred by means of a rotary movement of the spindle 60 to the corresponding stator 23, whereby the orientation of the splicing disc 102 at all times coincides with the orientation of the nose of the craft with respect to the indicator surface so that, should this rotation be transferred, as shown on Sheet No. 3, by means of a gear 103 to a small projector 104, provided with a projection lamp 105, this light will then be projected through a transparent disc 106, upon which the silhouette or outline of an aircraft or ship is engraved, and inside which said system is mounted, achieving thereby a location, not alone of the position of the craft by intersection of the two QTE lines, but furthermore, the direction or approximate route, while excluding any possible drift of the craft, that can easily be determined by means of this new system.

In the event of an existing ground station, applied to transmit information to aircraft concerning the angle that with respect to the geographical north forms the line which on the ground connects said craft with the QTE broadcasting station, as also the distance separating same, it will suffice to operate only one of the two luminous spots so as to find said angle, however, in this case it is required to know at which point of the luminous line the aircraft is situated in order to determine its position. This can be achieved when the luminous line is marked at certain distances so that in order to know its position it will suffice to read upon said luminous scale, the distances shown on the radioelectrical distance measuring equipment.

By this means, a semi-automatic performance is acquired which, however, is not absolutely precise due to the difficulty found in projecting upon a map, a luminous line calibrated to distances. Nevertheless, in virtue of the simplicity of this solution, a cheapening of the system can be achieved in comparison with the following more complete design: The motor that is applied to the radioelectrical distance measuring equipments so as to operate the meter or distance indicator, can also work a shutter in such a manner that the luminous line that is usually produced by the projection lamp of the equipment, is either lengthened or curtailed in such a manner that it is intersected precisely at the point which, on the plane, actually represents the position of the aircraft.

Figure 1:
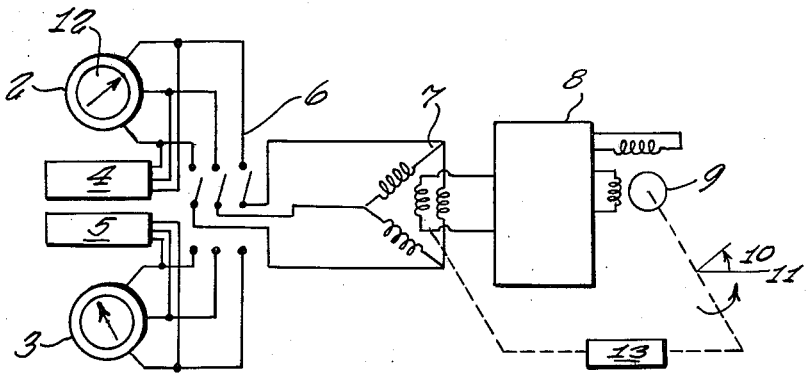
Figure 2:
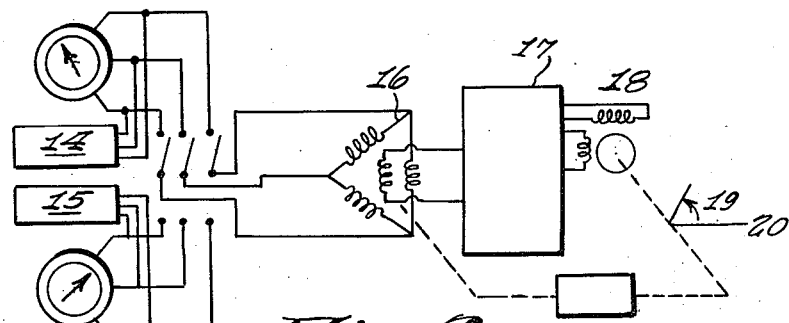
Figure 3:
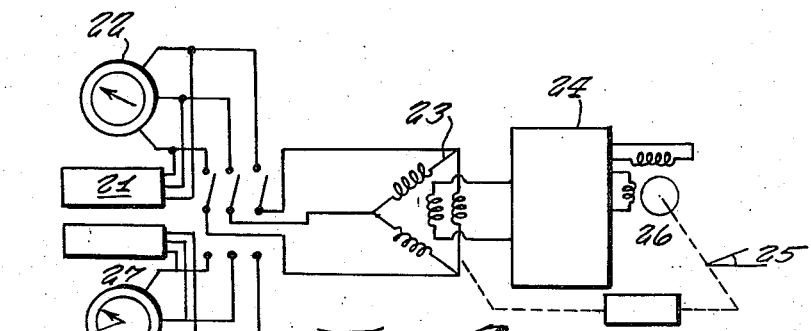
Figure 4:
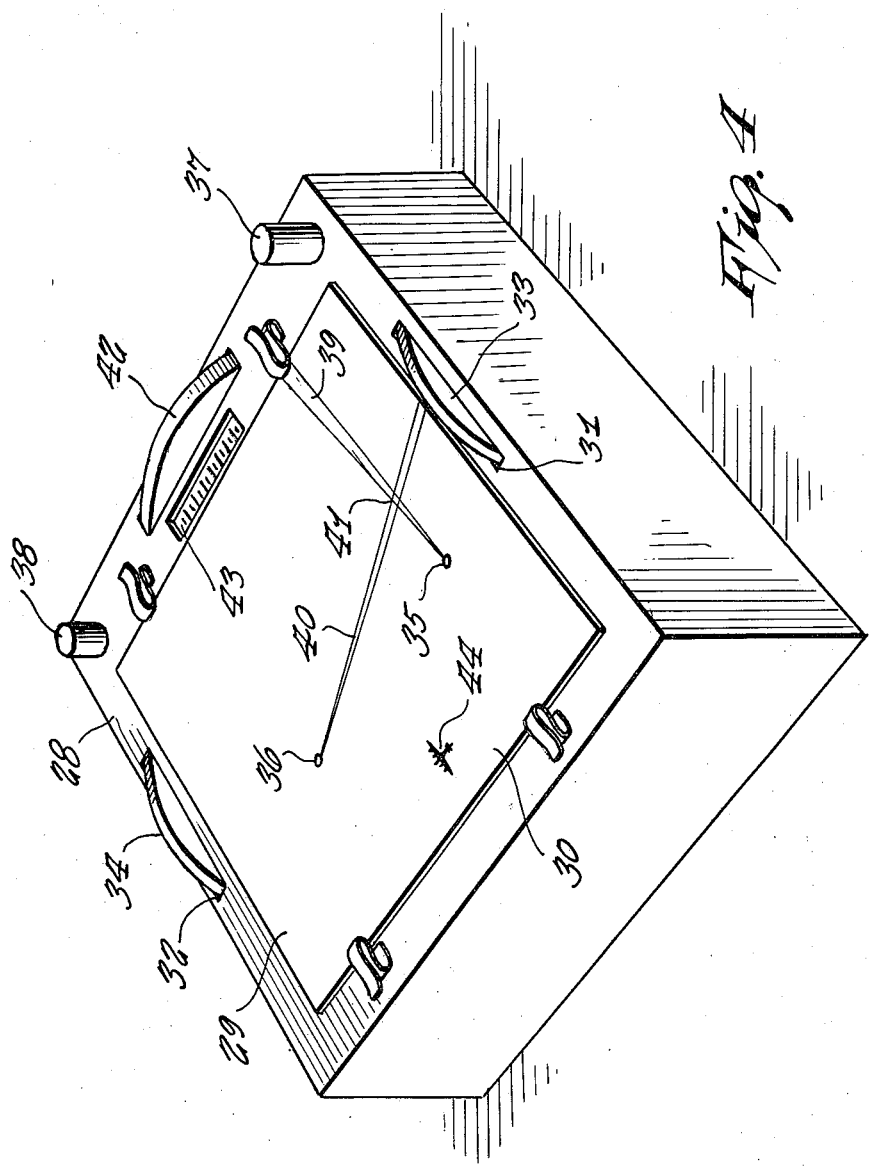
Figure 5:
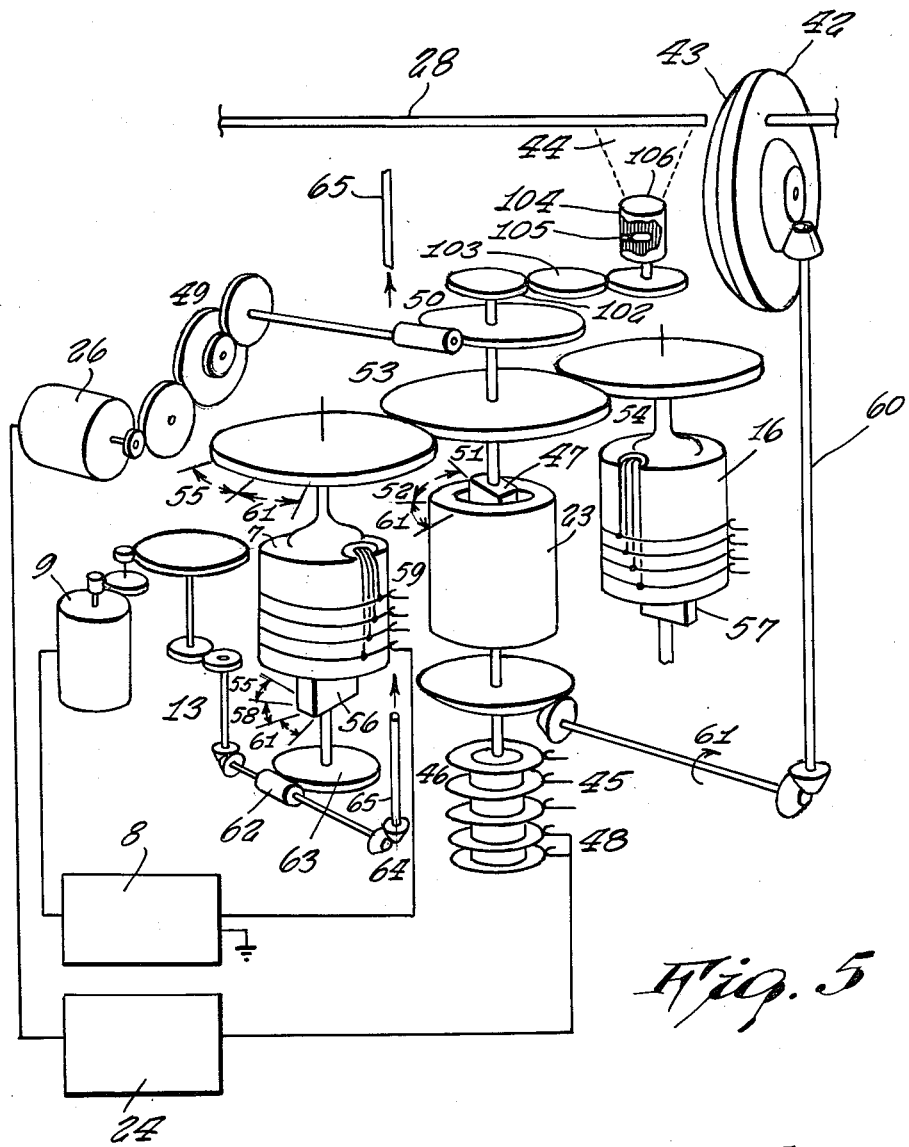
Figure 6:
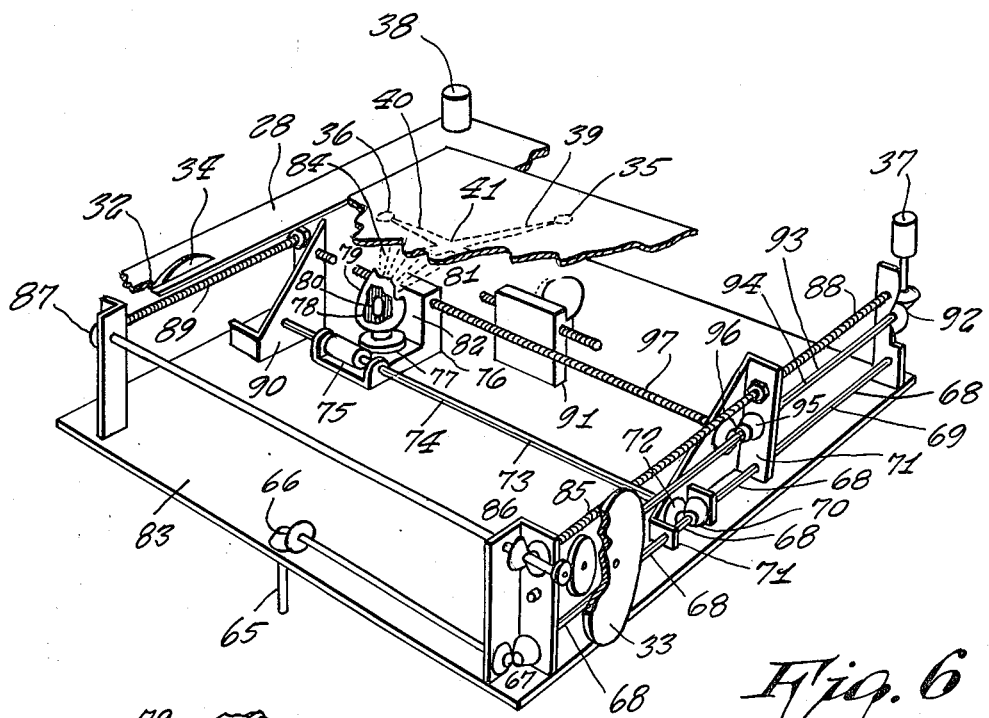
Figure 7:
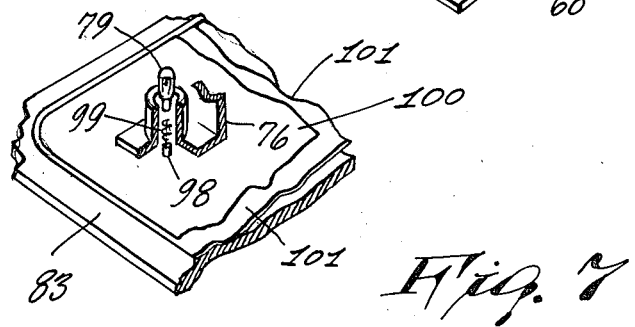
Figure 8:
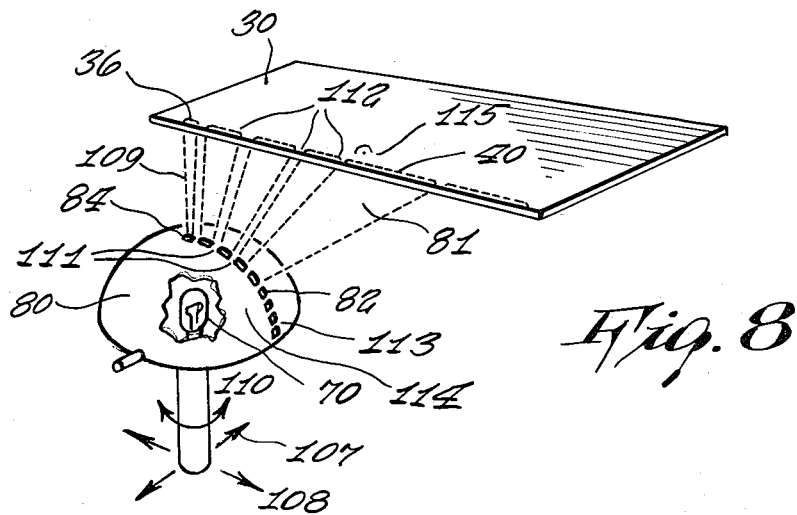
FIG. 8 illustrates how the luminous line can be calibrated to distances.
Figure 9:
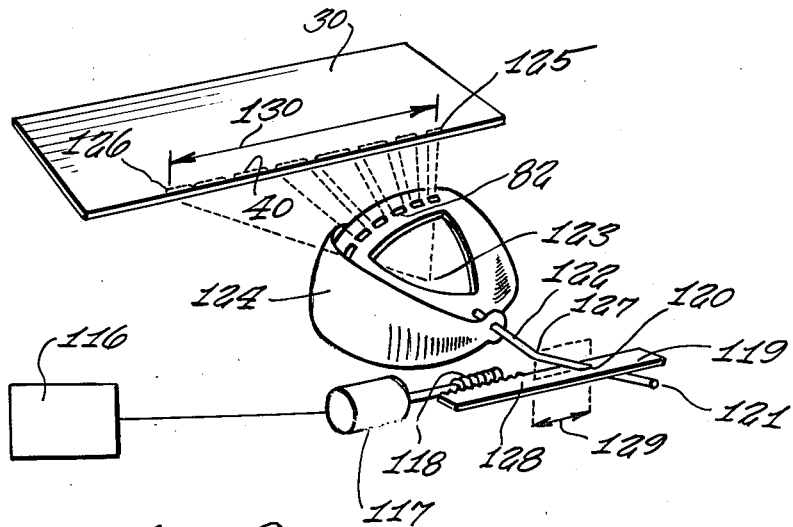
FIG. 9 shows, in a nonlimiting manner, the principle applied to modify the entire length of the luminous line so that without knowing the numerical distance at which the broadcasting station is situated, the actual position of the aircraft is shown.

The hood 80, shown in FIG. 8, can be moved in two different directions as is indicated by the double arrows 107 and 108 in order to cause the beam of light 109 to coincide with the point 36, which on the map 30 represents the situation of the broadcasting station.

The light emitted by the small lamp 79 issues through a slot 82 in said hood 80, thus projecting a luminous line 40 on to the map 30 at an angle corresponding to the geographical north that is shown on the map in virtue of a rotation, as is represented by the curved arrow 110, and which is controlled by the heretofore described mechanism.

The referred to slot 82 is provided with opaque bridges 111 that are arranged in such a manner that the projection of their shadow on to the luminous line 40 will thereby form dark marks 112, conveniently representing kilometers, miles, or determined fractions thereof. However, as said bridges 111 have to be concentrated with the portion 113 of the slot 82, when it is desirous to maintain an equidistance of said marks 112 at such points of the luminous line 40 that are at a distance from the starting point of said luminous line, it will be advisable to change the distance represented between two consecutive shadows 112 from a determined fixed distance onward. The change of scale can be indicated by means of two orifices 114 applied to the referred to hood 80 and which will thus form two small luminous spots 115, to indicate the change of scale.

In addition to this calibration of the luminous line, the electrical indications that a conventional and known DME, TACAN, etc. type of radioelectrical distance measuring receiver 116 which controls a small motor that operates the meter or indicator of said equipment, are caused to operate in place thereof or simultaneously therewith another small motor 117, whose shaft terminates in a worm 118 in order to effect a longitudinal displacement of an element 119, provided with an orifice 120 through which a small bar 121, forming part of said shaft 122, can slide freely, this latter being perpendicular to the plane of the slot 82 and conveniently passes through the luminous spot 123. A rotation of said shaft 122 will move the shaft of a shutter in the shape of a spherical sector 124, which thereby closes the slot 82 to a greater or lesser extent.

Due to the similarly between the triangles formed by the vertices 123, 125 and 126 and by the vertices 120, 127 and 128, it will be found that the longitudinal displacement of the element 119 indicated by the arrow 129, is in proportion with the entire length of the luminous line represented by the arrow 130, so that the point 126 at which the luminous line 40 ends, represents the situation of the aircraft, as the angle of the luminous line 40 formed with the geographical north of the map 30 is identical to the angle that the line forms with the geographical north which on the ground connects the aircraft with the broadcasting station and because the distance represented by the arrow 119 and this latter, is in proportion with the displacement 129 of said element 119 and this in turn in proportion with the electrical indication that the receiver 116 gives as representative of the distance of the aircraft from the broadcasting station so that, by properly selecting the constants of proportionality, such as the distance from the luminous spot to the translucent plane, the distance from the shaft 122 to the sliding element 119 and the thread pitch of the worm 118, it will be possible to obtain the distance represented by the arrow 130, in accordance with the scale at which the plane 30 has been traced, with the actual distance between the aircraft and the broadcasting station, and therefore it is found that the point 126 actually represents the position of the aircraft.

It is, of course, understood that when using one ground station only, corrections have to be computed according to distance from ground station, difference in altitude between craft and ground station, and also according to the scale of the map used. It would appear that if two ground stations are used (and the second station can be either DME or VOR or ADF), the intersection point on the map of the two projected light rays is the true geographical position point of the craft.

What I claim is:

1. A system for continuous radiolocation on board a craft comprising at least one radio receiver having means for determining the bearing, each said radio receiver being tuned to the signal of a radio ground station, a translucent sheet receiving a map showing the navigation zone of the craft, a projector for each said radio receiver, each said projector projecting on said screen and map a luminous pattern comprising a dot and a straight line with luminous distance marks passing through said dot, means displacing each said projector in a plane parallel to the screen to superimpose the projector dot on the location of the corresponding ground station on the map, means to lengthen or curtail the luminous line corresponding to the distance from the radio station, and means imparting to each said projector an angular displacement about an axis perpendicular to said screen, said angular displacement of each said projector corresponding to the algebraic sum of the bearing angle formed by the direction of the ground station with the direction of the craft plus the heading angle formed by the craft with a known geographic direction, plus the angle formed by the geographic north-south line in the map with a reference line top-bottom in the indicator, plus the angle formed by the magnetic declination existing in the overflown zone, whereby the luminous lines projected on said map represent the imaginary straight lines originating from said ground station and passing through the craft, whereby the intersections of said lines on said map indicate the geographic position of the craft, and the length of the luminous lines measured by means of luminous marks indicates the distance of the craft from each said radio station.

2. The radiolocation system as defined in claim 1, comprising means to project on said map an image of the craft indicating the direction thereof.

3. The radiolocation system as defined in claim 1, wherein said means for angular displacement of said projectors comprise a first synchronous motor, a servo-mechanism transmitting an angular displacement expressing the magnetic track of the craft to the magnetic field of the stator of said first motor, two other synchronous motors, the rotors of said motors being turned by an angle controlled by the bearing indication, gears transmitting the rotation of the rotor of said first motor to the stators of said other motors, manually operated means imparting to the stator of said first motor an angular displacement corresponding to the angle formed by the direction of the map with a known geographic direction corrected by the magnetic declination, said displacement of the stator producing an adjustment of the rotor of said first motor, means to transmit said displacement to the stators and rotors of said other motors, and gears connecting said rotors with said projectors.

4. The radiolocation system as defined in claim 1, wherein said projectors comprise a projection bulb, a rotatable housing, a radial slot provided with interstices whose projection on to the map produces the distance marks in said housing, and a tinted lens on the axis of said housing, whereby a beam of colored light is sent along said axis through said lens as well as a sheet beam of light through said slot.

5. The radiolocation system as defined in claim 4, wherein said radial slots of said projectors that produce the luminous tracings with distance marks, are more or less closed by means of a shutter that is operated by a conventional type of distance measuring receiver, so that the length of the luminous line on the map will represent the actual distance between the ground station and the craft.

6. The radiolocation system as defined in claim 1, comprising displaceable supports for said projectors and means displacing respectively said supports in two directions which are perpendicular to each other, whereby each point in the rectangle formed by the maximum displacements of the supports is within reach of the light projected by at least one of the projectors.

7. A system for continuous radio location on board a craft as set forth in claim 1, including a single radio receiver tuned to a single radio ground station, a single projector projecting a luminous line upon the map, said luminous line indicating the direction of the craft in relation to the ground station, and the length of the luminous line indicating the distance of the craft from said ground station, whereby the geographic position of the craft may be determined with reference to a single ground station.

References Cited in the file of this patent

UNITED STATES PATENTS 2,485,663    Rusch _____ Oct. 25, 1949

FOREIGN PATENTS 847,615    France _____ Oct. 12, 1939